United States Patent
Griffiths et al.

(10) Patent No.: US 9,671,780 B2
(45) Date of Patent: Jun. 6, 2017

(54) PLAYBACK DEVICE CONTROL

(71) Applicant: Sonos, Inc., Santa Barbara, CA (US)

(72) Inventors: Neil Griffiths, Lexington, MA (US); Chris Bierbower, Santa Barbara, CA (US); Matt Nelson, Santa Barbara, CA (US); Paul Kafadar, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 67 days.

(21) Appl. No.: 14/500,465

(22) Filed: Sep. 29, 2014

(65) Prior Publication Data

US 2016/0011590 A1    Jan. 14, 2016

(51) Int. Cl.
    *G06F 17/00*     (2006.01)
    *G05B 19/42*     (2006.01)
    *G06F 3/16*      (2006.01)

(52) U.S. Cl.
    CPC ............ *G05B 19/42* (2013.01); *G06F 3/165* (2013.01); *G05B 2219/23249* (2013.01)

(58) Field of Classification Search
    CPC .......... G05B 19/42; G05B 2219/23249; G06F 3/165
    USPC .......................................................... 700/94
    See application file for complete search history.

(56) References Cited

U.S. PATENT DOCUMENTS

| 5,440,644 | A  | 8/1995  | Farinelli et al. |
| 5,761,320 | A  | 6/1998  | Farinelli et al. |
| 5,923,902 | A  | 7/1999  | Inagaki |
| 6,032,202 | A  | 2/2000  | Lea et al. |
| 6,256,554 | B1 | 7/2001  | DiLorenzo |
| 6,404,811 | B1 | 6/2002  | Cvetko et al. |
| 6,469,633 | B1 | 10/2002 | Wachter |

(Continued)

FOREIGN PATENT DOCUMENTS

| EP | 1389853 A1 | 2/2004 |
| WO | 0153994    | 7/2001 |
| WO | 03093950 A2 | 11/2003 |

OTHER PUBLICATIONS

"AudioTron Quick Start Guide, Version 1.0", Voyetra Turtle Beach, Inc., Mar. 2001, 24 pages.

(Continued)

*Primary Examiner* — Paul McCord
(74) *Attorney, Agent, or Firm* — McDonnell Boehnen Hulbert & Berghoff LLP

(57) ABSTRACT

Examples described herein involve a playback device performing one or more playback device actions based on locations of one or more physical contacts on an external surface of the playback device. A processor of the playback device may receive from an array of proximity sensors underlying an external surface of the playback device, location data indicating a physical contact at a location on the external surface. Based on at least the location, the processor may identify a playback device action from a plurality of playback device actions, and cause at least the playback device to perform the identified playback device action. The playback device may further include at least one orientation sensor from which the processor may also receive orientation data indicating an orientation of the playback device. The processor may identify identify the playback device action also based on the orientation of the playback device.

20 Claims, 7 Drawing Sheets

(56) References Cited

U.S. PATENT DOCUMENTS

| | | | |
|---|---|---|---|
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,840,740 | B2 | 11/2010 | Minoo |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington et al. |
| 8,483,853 | B1 | 7/2013 | Lambourne |
| 8,811,630 | B2 * | 8/2014 | Burlingame ............ H03G 5/005 381/103 |
| 9,008,725 | B2 * | 4/2015 | Schmidt ................ H04W 88/02 345/173 |
| 9,030,407 | B2 * | 5/2015 | Ronkainen ............ G06F 3/0416 345/156 |
| 9,292,045 | B2 * | 3/2016 | Shultz ................ H04M 1/72522 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2006/0123080 | A1 * | 6/2006 | Baudino ............... H04L 67/306 709/204 |
| 2007/0142944 | A1 | 6/2007 | Goldberg et al. |
| 2008/0045140 | A1 * | 2/2008 | Korhonen ........... H04M 1/7253 455/3.06 |
| 2008/0077261 | A1 * | 3/2008 | Baudino ................ H04H 20/63 700/94 |
| 2008/0152165 | A1 * | 6/2008 | Zacchi ..................... H04R 5/04 381/77 |
| 2008/0214160 | A1 * | 9/2008 | Jonsson ................ G06F 3/0346 455/414.2 |
| 2011/0002487 | A1 * | 1/2011 | Panther .................... H04R 5/04 381/300 |
| 2011/0312349 | A1 * | 12/2011 | Forutanpour ......... G06F 1/1626 455/466 |
| 2013/0022221 | A1 * | 1/2013 | Kallai ..................... H04R 3/12 381/300 |
| 2013/0129122 | A1 * | 5/2013 | Johnson .................. H04R 3/12 381/306 |
| 2013/0202132 | A1 | 8/2013 | Zurek et al. |
| 2013/0273869 | A1 | 10/2013 | Parker et al. |
| 2013/0279706 | A1 * | 10/2013 | Marti ..................... G06F 3/165 381/57 |
| 2013/0287228 | A1 * | 10/2013 | Kallai ..................... H04R 3/14 381/107 |
| 2014/0086415 | A1 * | 3/2014 | Sim ....................... G06F 1/1688 381/17 |
| 2014/0244013 | A1 | 8/2014 | Reilly |
| 2015/0181337 | A1 * | 6/2015 | Rodgers .................. H04R 5/02 381/304 |
| 2016/0057555 | A1 * | 2/2016 | Schuster .................. H04R 3/04 381/59 |

OTHER PUBLICATIONS

"AudioTron Reference Manual, Version 3.0", Voyetra Turtle Beach, Inc., May 2002, 70 pages.

"AudioTron Setup Guide, Version 3.0", Voyetra Turtle Beach, Inc., May 2002, 38 pages.

Bluetooth. "Specification of the Bluetooth System: The ad hoc Scatternet for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

International Searching Authority, International Search Report and Written Opinion mailed on Dec. 15, 2015, issued in connection with International Application No. PCT/US2015/052584, filed on Sep. 28, 2015, 12 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo" Analog Stereo Jun. 24, 2000 retrieved Jun. 18, 2014, 2 pages.

Louderback, Jim, "Affordable Audio Receiver Furnishes Homes With MP3" TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

UPnP; "Universal Plug and Play Device Architecture," Jun. 8, 2000; version 1.0; Microsoft Corporation; pp. 1-54.

"Denon 2003-2004 Product Catalog," Denon, 2003-2004, 44 pages.

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2003, entitled "Controlling and manipulating groupings in a multi-zone music or media system," 82 pages.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

\* cited by examiner

PLAYBACK DEVICE CONTROL

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from a plethora of sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
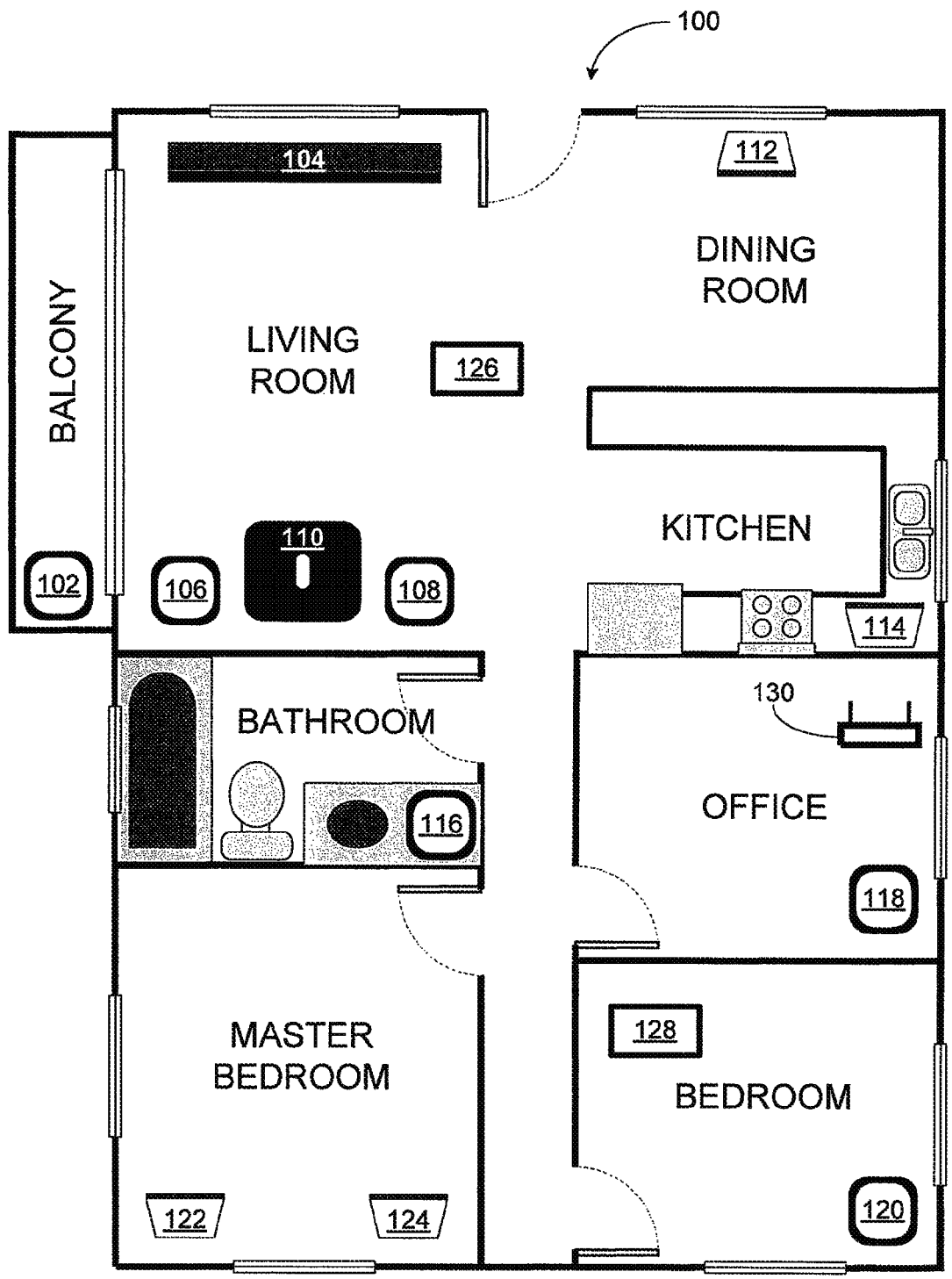
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

In some cases, a playback device may be controlled using a controller device and/or buttons on the playback device. However, if a user wants to conveniently provide a certain control command to the playback device, accessing a user interface provided by a controller application on the controller device to provide the control command, or locating and identifying a button on the playback device, then pressing the button to provide the control command, may be relatively burdensome.

Examples discussed herein involve a playback device performing one or more playback device actions based on locations of one or more interactions (i.e. physical contacts and/or physical presences) on or near (i.e. within a predetermined proximal distance from) an external surface of the playback device. In other words, the playback device may be controlled, at least to some extent, by one or more touches on the playback device. In a case the playback device is one of a group of playback devices configured to play media content in synchrony, the other playback devices in the group may also perform the one or more playback device actions. In another case, one or more other playback devices in communication with the playback device may also perform the one or more playback device actions whether or not they are part of a group of playback devices configured to play media in synchrony with the playback device.

Accordingly, the user may provide the certain control commands by touching certain locations or regions on the external surface of the playback device, without needing to access the user interface or locate and identify specific buttons.

In one example, the playback device may have an array of proximity sensors underlying an external surface of the playback device. The array of proximity sensors may include one or more types of sensors configured to detect proximal movement or contact on the external surface of the playback device. The external surface may include any one or more surfaces on the playback device that is substantially perpendicular to a speaker grill of the playback device. The speaker grill of the playback device may be on a side of the playback device where outward-facing speakers of the playback device are positioned.

In one case, the external surface of the playback device may include two or more regions. In one instance, a first subset of the array of proximity sensors may underlie a first region of the external surface, and a second subset of the array of proximity sensor may underlie a second region of the external surface.

In one example, a processor of the computing device may receive from the array of proximity sensors, location data indicating a physical contact at a location on the external surface. In one case, the location data may indicate which one or more proximity sensors in the array of proximity sensors detected the physical contact. Based on locations of the one or more proximity sensors that detected the physical contact, the processor may determine whether the physical contact occurred on the first region of the external surface or the second region of the external surface.

Based on at least the location and/or the region of the physical contact, the processor may identify a playback device from a plurality of playback device actions. The plurality of playback device actions may include beginning playback of media content, pausing playback of media content, increasing a playback volume of the playback device, and decreasing a playback volume of the playback device, among other possibilities.

In one example, if the location of the detected physical is in the first region of the external surface, the processor may identify the playback device action of increasing the playback volume of the playback device. On the other hand, if the location of the detected physical contact is in the second region of the external surface, the processor may identify the playback device of decreasing the playback volume of the playback device. Other examples are also possible.

Upon identifying the playback device action, the processor may then cause at least the playback device to perform the identified playback device action. For instance, if the identified playback device action is to increase the playback volume of the playback device, the processor may cause the playback volume of the playback device to increase.

The playback device action may be identified further based on additional data received from the array of proximity sensors and/or data received from other components in the playback device. In one example, additional data received from the array of proximity sensors may indicate a type of the physical contact. In one instance, the physical contact may be a single tap at a single location or a swipe that traverses multiple locations. In some cases, the swipe may traverse locations in both the first and second regions of the external surface. In another instance, the physical contact may be one of two or more concurrent physical contacts. In a further instance, the physical contact may be one of two or more successive physical contacts making up a sequence of single taps, or one or more double-taps. Other examples are also possible.

In one example, the playback device may further include at least one orientation sensor configured to provide orientation data that indicates an orientation of the playback device. In a first orientation of the playback device, the first region of the external surface may be above the second region of the external surface, while in a second orientation of the playback device, the second region of the external surface may be above the first region of the external surface.

The processor may accordingly identify the playback device action further based on the orientation of the playback device. In one case, the processor may identify the playback device action of increasing the playback volume of the playback device based on a physical contact at a location in the first region while the playback device is in the first orientation. On the other hand, the processor may identify the playback device action of decreasing the playback volume of the playback device based on a physical contact at the location in the first region while the playback device is in the second orientation.

In another example, the processor may identify the playback device action further based on a playback state of the playback device. In one case, the processor may identify the playback device action of pausing playback of media content based on a physical contact at a location in the first region while the playback device is playing media content. On the other hand, the processor may identify the playback device action of beginning playback of media content based on the physical contact at the location in the first region while the playback device is not playing media content.

In yet another example, the processor may identify the playback device action further based on whether the playback device is in motion. Motion of the playback device may be determined based on data received from the at least one orientation sensor in the playback device.

In one case, the processor may identify the playback device action of increasing a playback volume based on a physical contact at a location in the first region while the playback device is not in motion. On the other hand, the processor may identify a playback device action of "null" or no action based on a physical contact at the location in the first region while the playback device is in motion. In other words, one or more playback device actions may be disabled or deactivated while the playback device is in motion.

In some cases, the array of proximity sensors or a subset of the array of proximity sensors may be deactivated while the playback device is in motion. Accordingly, the processor may receive no data from the array of proximity sensors while the playback device is in motion. Other examples are also possible.

In some cases, the playback device may be part of a group of playback devices configured to play media content in synchrony. In such a case, some or all identified playback device actions may also be performed by other playback devices in the group of playback devices. For instance, if the playback device action of pausing playback of media content is identified, the processor may cause playback of media content by all playback devices in the group of the playback device to be paused. Further in some cases, the plurality of playback device actions that may be identified based on one or more detected physical contacts may also include adding the playback device to a group of playback devices and/or remove the playback device from the group of playback devices. Other examples are also possible.

As indicated above, the present discussions involve a playback device performing one or more playback device actions based on locations of one or more physical contacts on an external surface of the playback device. In one aspect, a playback device is provided. The playback device includes an array of proximity sensors underlying an external surface of the playback device. The external surface is substantially perpendicular to a speaker grill of the playback device. The playback device further includes a processor, and memory having stored thereon instructions executable by the processor to cause the processor to perform functions including receiving from the array of proximity sensors, location data indicating a physical contact at a location on the external surface, based on at least the location, identifying a playback device action from a plurality of playback device actions, and causing at least the playback device to perform the identified playback device action.

In another aspect, a playback device is provided. The playback device includes an array of proximity sensors underlying an external surface of the playback device. The external surface is substantially perpendicular to a speaker grill of the playback device. The playback device also includes at least one orientation sensor, a processor, and memory having stored thereon instructions executable by the processor to cause the processor to perform functions including receiving from the at least one orientation sensor, orientation data indicating an orientation of the playback device, receiving from the array of proximity sensors, location data indicating a physical contact at a location on the external surface, based on at least (i) the orientation of the playback device and (ii) the location on the external surface, identifying a playback device action from a plurality of playback device actions, and causing at least the playback device to perform the identified playback device action.

In a further aspect, a non-transitory computer readable medium is provided. The non-transitory computer readable medium has stored thereon instructions executable by a computing device to cause the computing device to perform functions including receiving from an array of proximity sensors underlying an external surface of a playback device, location data indicating a physical contact at a location on the external surface, based on at least the location, identifying a playback device action from a plurality of playback device actions, and causing at least the playback device to perform the identified playback device action.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
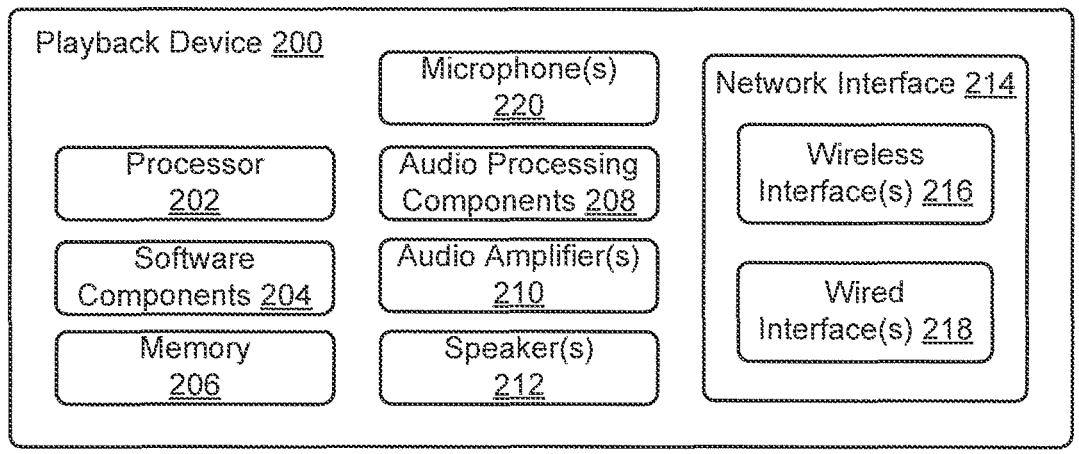
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, microphone(s) 220, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more of digital-to-analog converters (DAC), analog-to-digital converters (ADC), audio preprocessing components, audio enhancement components, and a digital signal processor (DSP), among others. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The microphone(s) 220 may include an audio sensor configured to convert detected sounds into electrical signals. The electrical signal may be processed by the audio processing components 208 and/or the processor 202. The microphone(s) 220 may be positioned in one or more orientations at one or more locations on the playback device 200. The microphone(s) 220 may be configured to detect sound within one or more frequency ranges. In one case, one or more of the microphone(s) 220 may be configured to detect sound within a frequency range of audio that the playback device 200 is capable or rendering. In another case, one or more of the microphone(s) 220 may be configured to detect sound within a frequency range audible to humans. Other examples are also possible.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
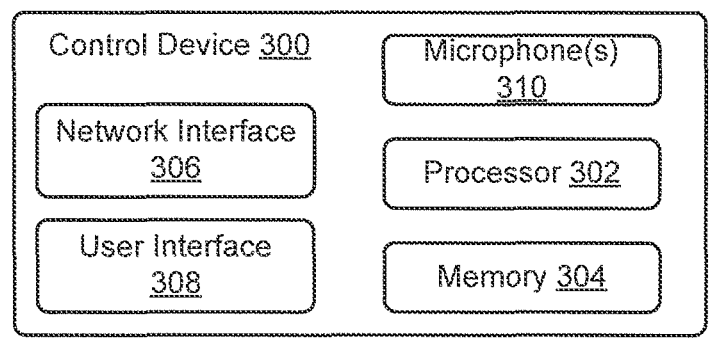
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, a user interface 308, and microphone(s) 310. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

The microphone(s) 310 may include an audio sensor configured to convert detected sounds into electrical signals. The electrical signal may be processed by the processor 302. In one case, if the control device 300 is a device that may also be used as a means for voice communication or voice recording, one or more of the microphone(s) 310 may be a microphone for facilitating those functions. For instance, the one or more of the microphone(s) 310 may be configured to detect sound within a frequency range that a human is capable of producing and/or a frequency range audible to humans. Other examples are also possible.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
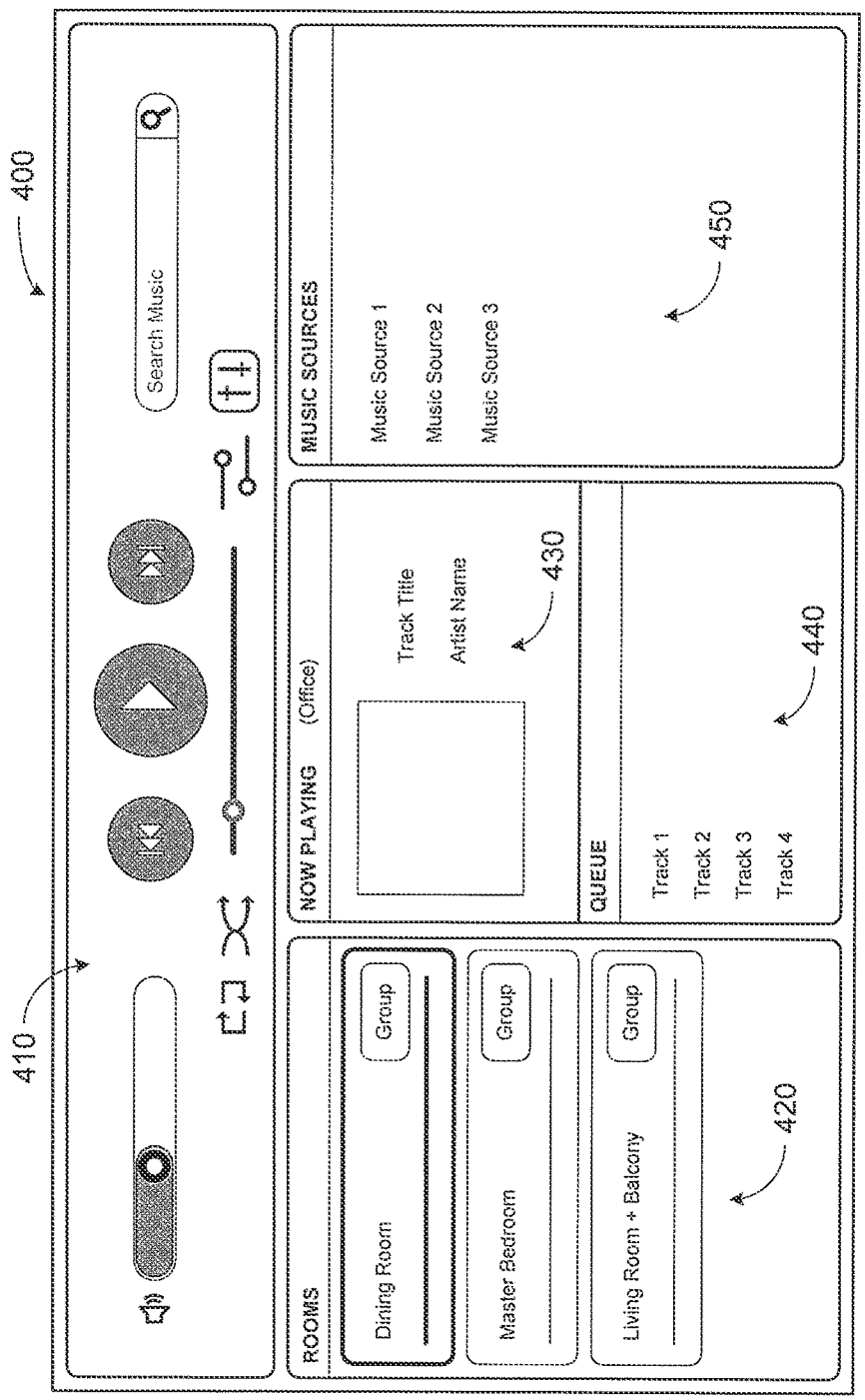
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

Figure 5A:
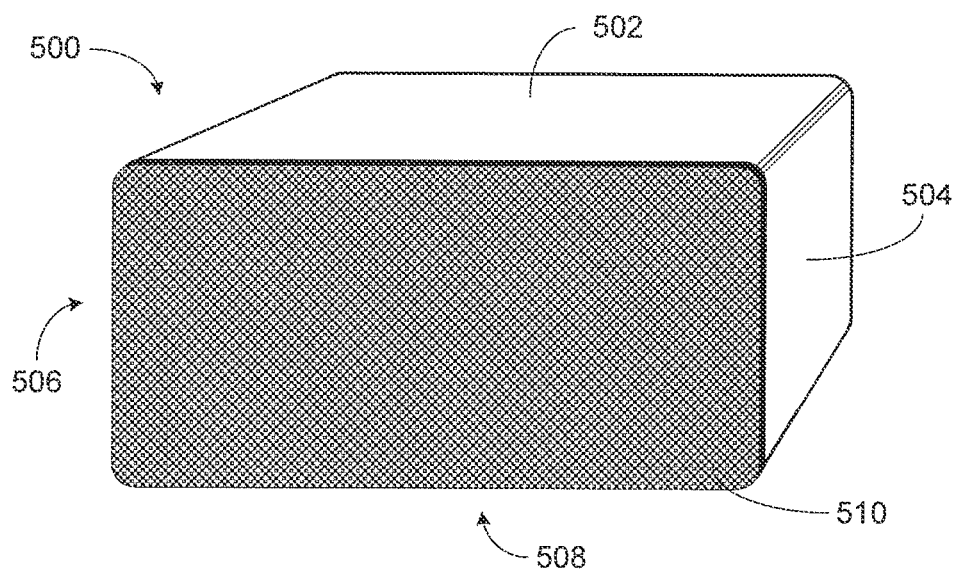
FIG. 5A shows example external surfaces of a playback device.

III. Example Playback Device Control Based on Physical Interactions with a Playback Device As indicated above, some examples discussed herein relate to a playback device performing one or more playback device actions based on locations of one or more physical interactions (i.e. physical contacts and/or physical presences) on or near (i.e. within a predetermined proximal distance from) an external surface of the playback device. FIG. 5A shows an example of a playback device 500 that has an external surface configured to detect the one or more physical contacts and that may perform the one or more playback device actions based on locations of the detected one or more physical contacts. The playback device 500 may be similar to the playback device 200 of FIG. 2, and may operate as a part of a media playback system, such as the media playback system 100 shown in FIG. 1.

The playback device 500 has a speaker grill 510 and an external surface. The speaker grill 510 may cover a side of the playback device 500 where outward facing speakers of the playback device 500 may be positioned. The external surface may include a first surface 502 and a second surface 504, each of which, as shown, may be substantially perpendicular to the speaker grill 510. The external surface may also include a third surface 506 and a fourth surface 508 that, in FIG. 5A are obscured by the speaker grill 510 and a body of the playback device 500. In some cases, the external surface may further include a back surface of the playback device 500 (not shown), opposite the speaker grill 510.

Figure 5B:
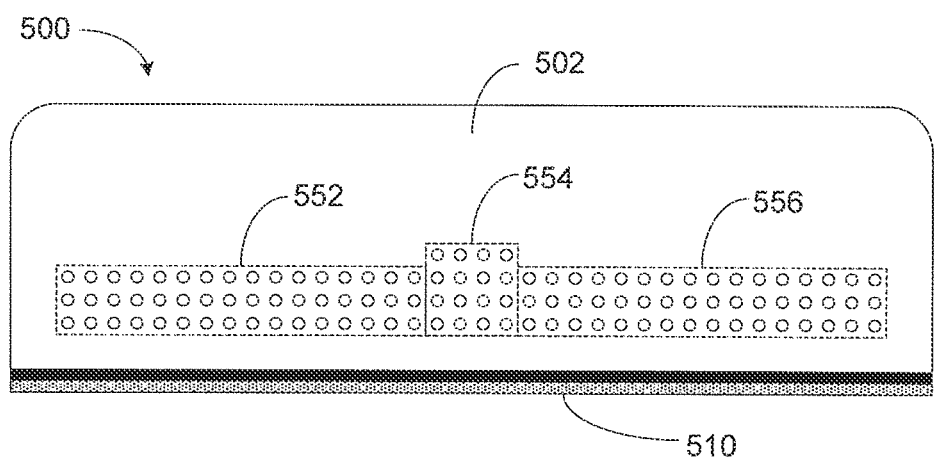
FIG. 5B shows example regions on an external surface of a playback device.

FIG. 5B shows an alternate view of the playback device 500 from above the playback device 500. In other words, FIG. 5B shows the first surface 502 of the playback device 500. As shown, the first surface 502 may include a first region 552, a second region 554, and a third region 556. Also shown in FIG. 5B is an array of proximity sensors (each represented as a circle) underlying the external surface of the playback device 500. In this case, a first subset of the array of proximity sensors may underlie the first region 552 of the first surface 502, a second subset of the array of proximity sensors may underlie the second region 556 of the first surface 502, and a third subset of the array of proximity sensors may underlie the third region 556 of the first surface 502.

The array of proximity sensors may include one or more types of proximity sensors. For instance, the array of proximity sensors may include one or more capacitive sensors, one or more resistance sensors, one or more Piezo sensors, one or more infrared sensors, one or more inductive sensors, one or more magnetic sensors, and one or more optical sensors, among other possibilities. The array of proximity sensors may be configured to detect physical contact on the first, second, or third regions on the first surface 502. In some cases, the array of proximity sensors may further be configured to detect presence or movement within a proximal distance of the first region 552, second region 554 or third region 556 on the first surface 502. In one case, the one or more types of proximity sensors in the array of proximity sensors may be selected based on a type of material of the first surface 502 and/or a construction of the playback device. Other examples are also possible.

Figure 6:
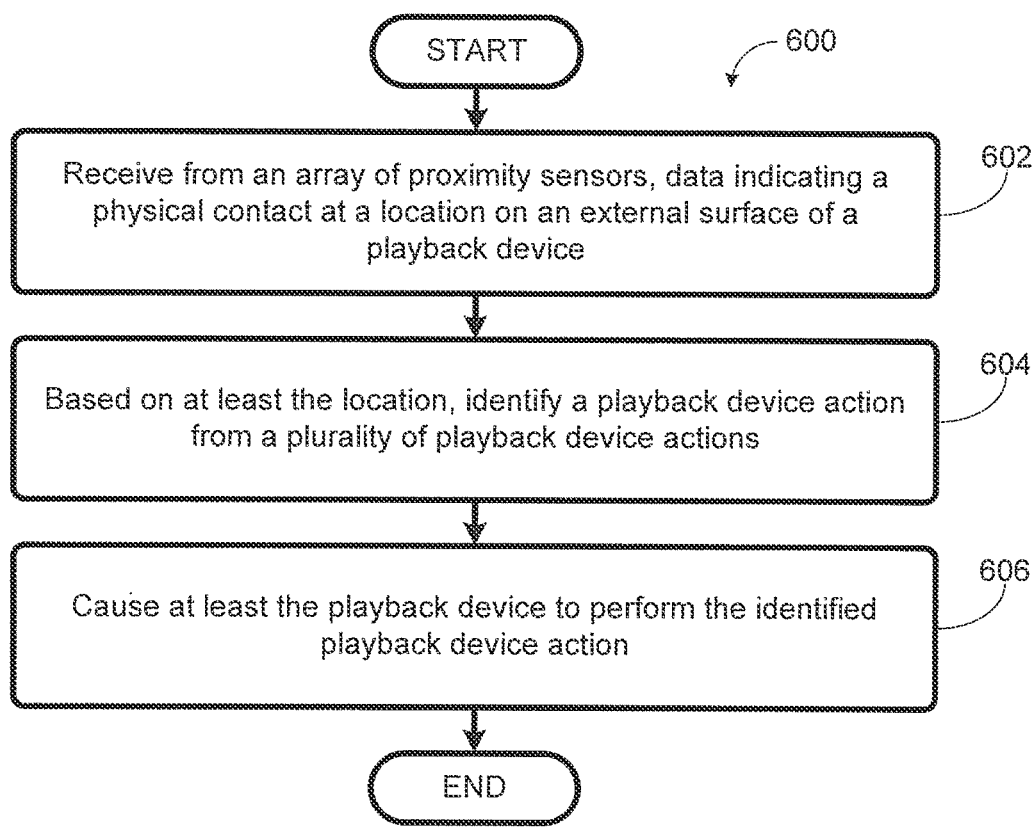
FIG. 6 shows an example flow diagram of a first method for performing a playback device action based on a physical contact on an external surface of a playback device.

FIG. 6 shows an example flow diagram of a first method 600 for performing a playback device action based on a physical contact on an external surface of a playback device. Method 600 shown in FIG. 6 presents an embodiment of a method that can be implemented within an operating environment involving, for example, the media playback system 100 of FIG. 1, one or more of the playback device 200 of FIG. 2, and one or more of the playback device 500 of FIGS. 5A and 5B. In one example, the method 600 may be performed by a playback device, such as the playback device 200 of FIG. 2, or the playback device 500 of FIGS. 5A and 5B. In particular, the method 600 may be performed by a processor of the playback device, such as the processor 202 of the playback device 200, or a processor of the playback device 500. In another example, the method 600 may alternatively be performed in whole or in part by a computing device, such as a server in communication with the playback device.

Method 600 may include one or more operations, functions, or actions as illustrated by one or more of blocks 602-606. Although the blocks are illustrated in sequential order, these blocks may also be performed in parallel, and/or in a different order than those described herein. Also, the various blocks may be combined into fewer blocks, divided into additional blocks, and/or removed based upon the desired implementation. In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 600 and other processes and methods disclosed herein, each block may represent circuitry that is wired to perform the specific logical functions in the process.

As shown in FIG. 6, the method 600 involves receiving from an array of proximity sensors, data indicating a physical contact at a location on an external surface of a playback device at block 602, based on at least the location, identifying a playback device action from a plurality of playback device actions at block 604, and causing at least the playback device to perform the identified playback device action at block 606.

At block 602, the method 600 involves receiving from an array of proximity sensors, data indicating a physical contact at a location on an external surface of a playback device. Referring to the playback device 500, one or more of the array of proximity sensors underlying the first surface 502 may be configured to output data based on proximity sensing by respective proximity sensors. In one example, a proximity sensor in the array of proximity sensors may output data indicating a first value when no physical contact is detected by the proximity sensor, or output data indicating a second value when physical contact is detected by the proximity sensor. Accordingly, if the processor of the playback device 500 receives from a particular proximity sensor, data indicating the second value, the processor may determine that physical contact on the external surface of the playback device 500 was detected at a location within a range of the particular proximity sensor. In other words, the processor of the playback device 500 may determine the location of the physical contact on the external surface based on which of the array of proximity sensors outputted data indicating the second value. Other examples are also possible.

In addition to the location of the physical contact on the external surface, data outputted by one or more of the array of proximity sensors may further indicate other characteristics of the physical contact as well. In one example, the processor may receive from the array of proximity sensors, touch data indicating an initiation of the physical contact with the external surface. In one case, the initiation of the physical contact may be indicated when a particular physical contact is detected at a certain location without any physical contact detected at any locations adjacent to the certain location prior to the detection of the particular physical contact.

In another example, the processor may receive from the array of proximity sensors, release data indicating a termination of the physical contact with the external surface. In one case, the termination of the physical contact may be indicated when a particular physical contact is terminated at a certain location without any substantially immediate, subsequent physical contact detected at any locations adjacent to the certain location. Other examples are also possible.

In one example, the characteristics of the physical contact may also include a time duration of the physical contact. The time duration of the physical contact may be determined based on a duration of time between the initiation of physical contact and the termination of the physical contact. In one case, the physical contact may be characterized as a "tap" if the time duration of the physical contact is within a predetermined time duration range. For instance, the physical contact may be characterized as a tap if the time duration of the physical contact is between 40 milliseconds and 160 milliseconds. In some cases, In another case, the physical contact may be characterized as a "touch and hold" if the time duration of the physical contact is beyond the predetermined time duration range. For instance, the physical contact may be characterized as a tap and hold if the time duration of the physical contact is beyond 160 milliseconds.

In another example, if a second physical contact is detected after a termination of the first physical contact, characteristics of the second physical contact, the first physical contact, or the combination of the first and second physical contacts may include the duration of time between the termination of the first physical contact and the initiation of the second physical contact. In one case, the physical contact may be characterized as a "double-tap" if the initiation of the second physical contact occurs within a predetermined time duration after the termination of the first physical contact. For instance, the two taps may be characterized as a double-tap if the time duration between the two taps is less than 90 milliseconds.

As indicated above, the array of proximity sensors may further be configured to detect presence or movement within a proximal distance of the first region 552, second region 554 or third region 556 on the first surface 502. In one case, the two taps may be characterized as a double-tap further based on if a physical presence is within a predetermined proximal range of the external surface between the two taps. For instance, the two taps may be characterized as a double-tap if the physical presence remains within 8 mm from the external surface between the two taps.

In a further example, the physical contact on the external surface of the playback device 500 may traverse multiple locations on the external surface between the initiation of the physical contact and the termination of the physical contact. In one case, characteristics of the physical contact may include a direction of the traversal of the physical contact and/or a distance of the traversal of the physical contact. In one case, the physical contact may be characterized as a "swipe" if the physical contact traverses a predetermined minimum distance in a consistent direction. For instance, the physical contact may be characterized as a swipe if the physical contact traverses at least 20 millimeters on the external surface, along a primary axis of the array of proximity sensors. In some cases, the physical contact may be characterized as a swipe also based on a time duration of the physical contact. For instance, the physical contact may be characterized as a swipe only if the time duration of the physical contact is between 40 milliseconds and 800 milliseconds.

In some examples, concurrent physical contacts with the external surface may be detected by the array of proximity sensors. In some cases, the concurrent physical contact may be characterized together. For instance, if the concurrent physical contacts include two substantially concurrent taps, the concurrent physical contacts may be characterized as a "dual tap" rather than two individual, unrelated taps. In another instance, if the concurrent physical contacts include two substantially concurrent swipes, rather than being characterized as two individual, unrelated swipes, the concurrent physical contacts may be characterized as a "dual swipe" if the swipes are in substantially the same direction, a "pinch" if the swipes are in opposite directions towards each other, or a "stretch" if the swipes are in opposite directions away from each other. Other examples are also possible.

At block 604, the method 600 involves based on at least the location, identifying a playback device action from a plurality of playback device actions. Referring to the playback device 500 shown in FIG. 5B, a first playback device action may be identified if the physical contact is detected at a location in the first region 552, a second playback device action may be identified if the physical contact is detected at a location in the second region 554, and a third playback device action may be identified if the third physical contact is detected at a location in the third region 556.

In addition to the location of the physical contact, the playback device action may also be identified based on characteristics of the physical contact, a configuration of the playback device, and/or a playback state of the playback device. In one example, if the first playback device action is identified based on a tap physical contact detected in the first region 552, a fourth playback device action may be identified based on a double tap physical contact detected in the first region 552. In another example, if the first playback device action is identified based on a physical contact detected in the first region 552 while the playback device 500 is playing media content by itself, a fifth playback device action may be identified based on a physical contact detected in the first region 552 while the playback device 500 is playing media content as a part of a stereo pair of playback devices. In a further example, if the first playback device action is identified based on a physical contact detected in the first region 552 while the playback device is playing media content, a sixth playback device action may be identified based on a physical contact detected in the first region 552 while the playback by the playback device 500 is paused. Other examples are also possible.

For illustration purposes, the plurality of playback device actions from which the playback device action may be identified, may include (a) begin playback of media content, (b) pause playback of media content, (c) begin playback of a next media content in a playback queue of the playback device 500, (d) begin playback of a previous media content in the playback queue of the playback device 500, (e) restarting playback of media content being played by the playback device 500, (f) increasing a playback volume, (g) decreasing a playback volume, (h) replacing media content in the playback queue of the playback device 500 with a predetermined one or more media content, (i) disabling one or more playback device actions, and (j) enabling one or more playback device actions.

In some cases, as indicated throughout this discussion, the playback device 500 may be capable of playing media content by itself, or in synchrony with one or more other playback devices in a media playback system. As such, the plurality of playback device actions may further include (a) grouping of the playback device 500 with one or more other playback devices in a media playback system and (b) ungrouping of the playback device 500 from one or more other playback devices in the media playback system.

As indicated above, the playback device 500 may be one of a plurality of playback device in the media playback system and/or one of a subset of the plurality of playback devices playing media content in synchrony. In such a case, the plurality of playback device actions may include (a) begin playback of media content by the plurality of playback devices, (d) pause playback of media content by the plurality of playback devices, (e) begin playback of a next media content in a playback queue associated with the plurality of playback devices, (f) begin playback of a previous media content in the playback queue associated with the plurality of playback devices, (g) restarting playback of media content being played by the plurality of playback devices, (f) increasing a playback volume of the plurality of playback devices, (g) decreasing a playback volume of the plurality of playback devices, (h) replacing media content in the playback queue associated with the plurality of playback devices with a predetermined one or more media content, (i) disabling one or more playback device actions by the plurality of playback devices, and (j) enabling one or more playback device actions by the plurality of playback devices. Other examples are also possible.

As mentioned above, a respective playback device action in the plurality of playback device actions may correspond to one or more characteristics of a detected physical contact, such as a location of the physical contact, a configuration of the playback device 500, and/or a playback state of the playback device 500, among others. Accordingly, the respective playback device action may be identified based on the one or more characteristics of the detected physical contact.

Provided in Table 1 are illustrative examples of physical contact characteristics and respective playback device actions. One having ordinary skill in the art will appreciate that these are for illustration purposes only, and that other combinations and examples are also possible.

TABLE 1

| | Detected Physical Contact Characteristic(s) and Playback Device State | Playback Device Action |
|---|---|---|
| 1 | Tap in second region 554; Playback paused | Begin playback |
| 2 | Tap in second region 554; Playback ongoing | Pause playback |
| 3 | Tap in first region 552 | Decrease playback volume by 1 |
| 4 | Tap in third region 556 | Increase playback volume by 1 |
| 5 | Touch and hold in first region 552 | Decrease playback volume by 2 every 160 milliseconds |
| 6 | Touch and hold in third region 556 | Increase playback volume by 2 every 160 milliseconds |
| 7 | Double tap in second region 554; Playback paused | Begin playback of next track in playback queue |
| 8 | Double tap in second region 554; Playback ongoing | Skip to next track in playback queue |
| 9 | Swipe from left to right across second region 554 (or from first region 552 to third region 556) | Skip to next track in playback queue |
| 10 | Swipe from right to left across second region 554 (or from third region 556 to first region 552) | Skip to previous track in playback queue |
| 11 | Dual swipe from left to right across second region 554 (or from first region 552 to third region 556) | Fast forward track 15 seconds |
| 12 | Dual swipe from right to left across second region 554 (or from third region 556 to first region 552) | Rewind track 15 seconds |
| 13 | Pinch from first region 552 and third region 556 to second region 554 | Separate playback device from zone group of playback devices. |
| 14 | Stretch from second region 554 to first region 552 and third region 556 | Group playback device with other playback devices |

At block 606, the method 600 involves causing at least the playback device to perform the identified playback device action. In one example, if a playback device action of skipping to a next track in a playback queue, the processor may cause the playback device 500 to skip to the next track in the playback queue. In one case, block 606 may be performed in response to a playback device action identified at block 604.

As suggested previously, if the playback device 500 is a part of a zone group, the processor may further cause each of the other playback devices in the zone group to perform the same, or a corresponding playback device action. In such a case, the processor may further transmit to the other playback devices in the zone group, either directly or via a group coordinator of the zone group, a message to cause the other playback devices to skip to the next track in the playback queue.

Referring to Table 1, a tap in the first region 552 may correspond to increasing the playback volume by 1. In one case, if the playback device 500 is a part of a zone group, the tap in the first region 552 may correspond to increasing the playback volume by 1 by each of the playback devices in the zone group. In another case, only the playback volume of the playback device 500 is increased by 1. In such a case, another physical contact characteristic may correspond to increasing the playback volume by 1 by each of the other playback devices in the zone group. For instance, a dual tap in the first region 552 may correspond to an increase of playback volume by 1 for all playback devices in the zone group, including the playback device 500. Other examples are also possible.

In one example, the playback device 500, and/or other playback devices in a zone group with the playback device, if applicable may further provide feedback indicating that the physical contact was detected and/or that a corresponding playback device action has been identified and perform. For example, if the playback device 500 has one or more LEDs external to the playback device 500, the one or more LEDs may provide a visual indicator to indicate that the physical contact was detected and/or that the corresponding playback device action has been identified and performed.

In some cases, different visual indicators, or sequence of visual indicators may be provided based on the detected physical contact and/or corresponding playback device action. For instance, a single flash of the one or more LEDs may indicate that a playback volume of the playback device 500 has changed, while a double flash of the one or more LEDs may indicate that the playback device 500 (and other playback devices in the zone group with the playback device, if applicable) has skipped to a next track in the playback queue.

In another example, the playback device (and other playback devices in the zone group with the playback device, if applicable) may play an audio signal corresponding to identified and performed playback device action. For instance, if the playback volume of the playback device 500 is changed in response to a detected physical contact while the playback device 500 is not playing media content, the playback device 500 may play a brief audio signal at the new playback volume. Other examples are also possible.

IV. Example Playback Device Control Based on Physical Contact on Playback Device and Orientation of Playback Device In some example, a playback device may be positioned in different orientations depending on how a user of the playback device wishes to place the playback device. In some cases, an identification of a playback device action may further be based on an orientation of the playback device, in addition to a location of a detected physical interaction.

Figure 7A:
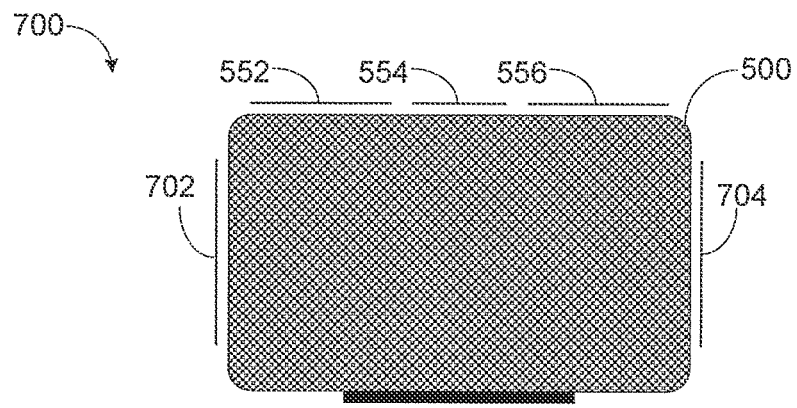
FIG. 7A shows a first example orientation of a playback device.
Figures 7B, 7C:
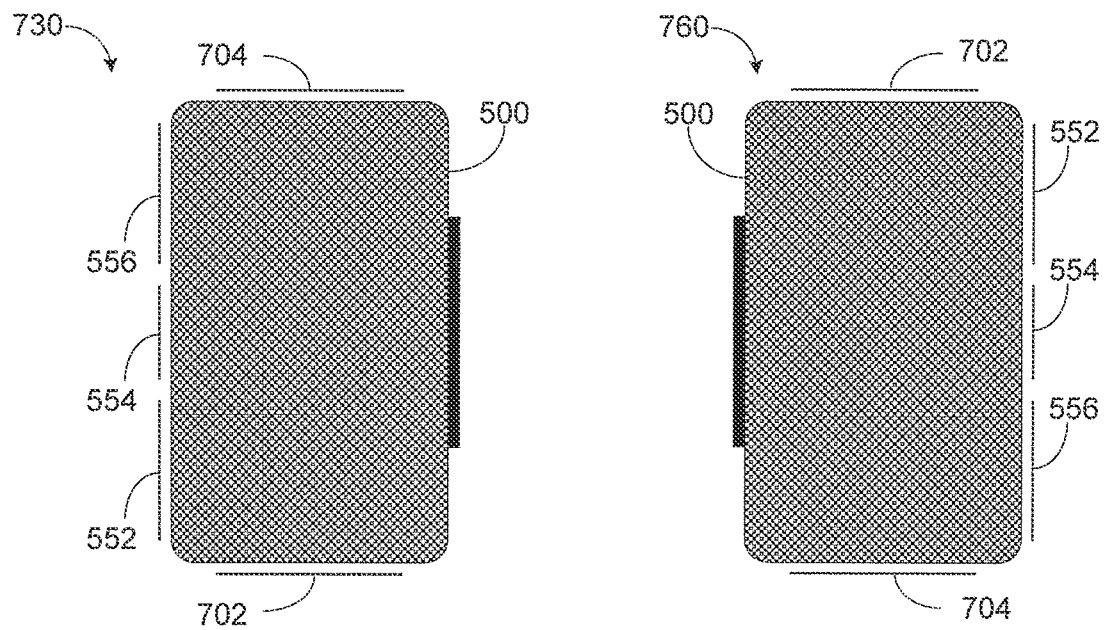
FIG. 7B shows a second example orientation of a playback device.
FIG. 7C shows a third example orientation of a playback device.

FIGS. 7A-7C show example orientations of the playback device 500. While FIGS. 7A-7C reference the playback device 500 of FIGS. 5A and 5B, as further discussed above in connection to the method 600 of FIG. 6, one having ordinary skill in the art will appreciate that the orientations shown and discussed in connection to FIGS. 7A-7C, and method 800 of FIG. 8 below, may also be applicable to other playback devices as well.

FIG. 7A shows a first example orientation 700 of the playback device 500. As shown from a perspective facing the speaker grill 510 of the playback device 500, the first orientation 700 may involve the first region 552, second region 554, and third region 556 being on a top side of the playback device 500. As indicated above, the array of proximity sensors may further underlie the second surface 504 of the playback device 500 and the third surface 506 of the playback device 500. In one example, a subset of the array of proximity sensors may underlie a fourth region 702 on the second surface 504, and a subset of the array of proximity sensors may underlie a fifth region 704 on the third surface 506. While in the orientation 702, the fourth region 702 may be on a left side of the playback device 500, and the fifth region 704 may be on a right side of the playback device 500.

FIG. 7B shows a second example orientation 730 of the playback device 500. As shown from the perspective facing the speaker grill 510 of the playback device 500, the second orientation 730 may involve the first region 552, second region 554, and third region 556 being on the left side of the playback device, the fifth region 704 being on the top side of the playback device 500, and the fourth region 702 being on a bottom side of the playback device 500. In this case, the third region 556 may be above the second region 554, which may further be above the first region 552.

FIG. 7C shows a third example orientation 760 of the playback device 500. As shown from the perspective facing the speaker grill 510 of the playback device 500, the third orientation 760 may involve the first region 552, second region 554, and third region 556 being on the right side of the playback device, the fifth region 704 being on the bottom side of the playback device, and the fourth region 702 being on the top side of the playback device 500. In this case, the first region 552 may be above the second region 554, which may further be above the third region 556.

Figure 8:
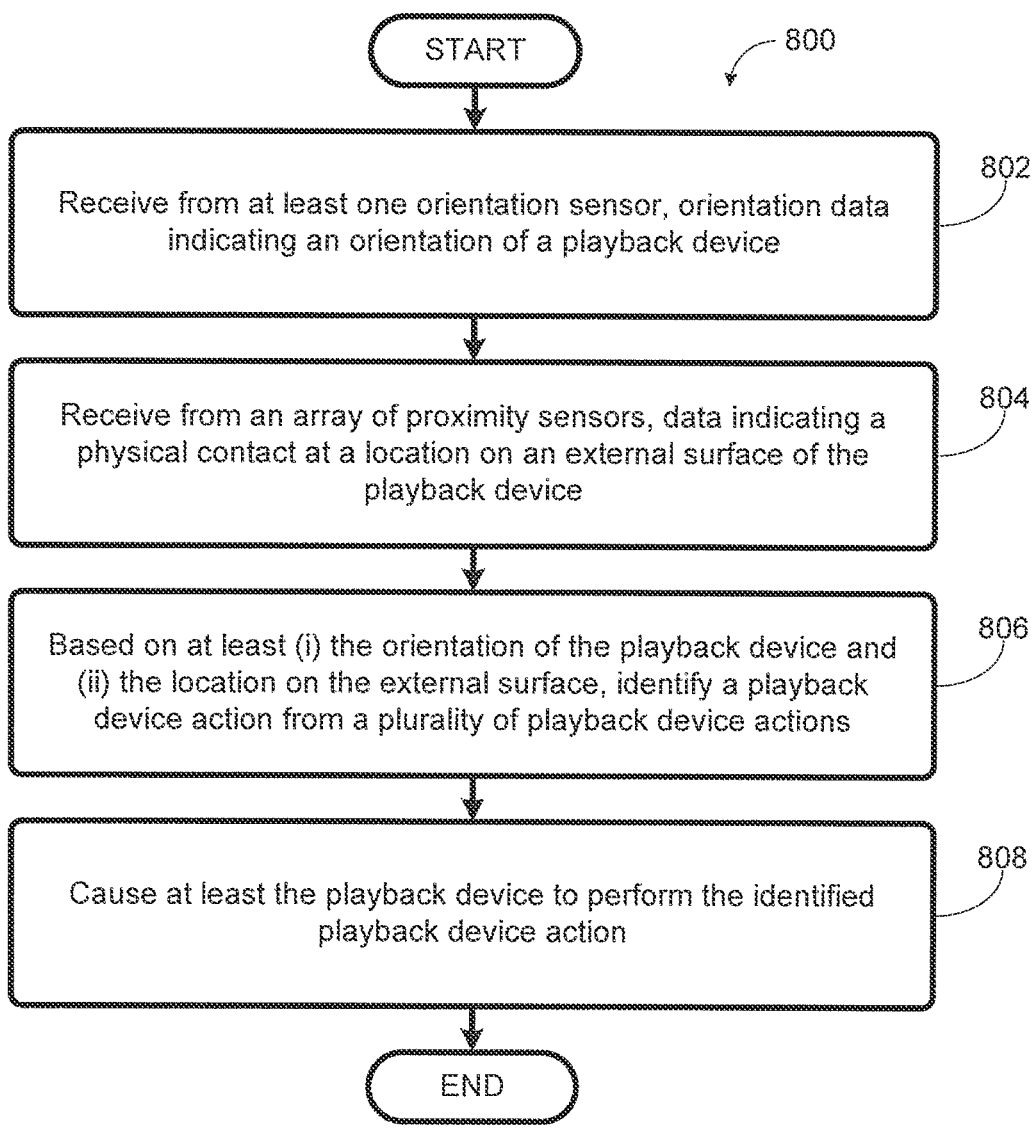
FIG. 8 shows an example flow diagram of a second method for performing a playback device action based on a physical contact on an external surface of a playback device.

FIG. 8 shows an example flow diagram of a second method 800 for performing a playback device action based on an orientation of a playback device and a physical contact on an external surface of the playback device. Method 800 shown in FIG. 8 presents an embodiment of a method that can be implemented within an operating environment involving, for example, the media playback system 100 of FIG. 1, one or more of the playback device 200 of FIG. 2, one or more of the control device 300 of FIG. 3, one or more of the playback device 500 of FIGS. 5A and 5B, and one or more of the playback devices 700, 730, and 760 of FIGS. 7A, 7B, and 7C, respectively. In one example, the method 800 may be performed by a playback device such as the playback device 200 of FIG. 2, or the playback device of FIGS. 5A, 5B, 7A, 7B, and 7C. In particular, the method 800 may be performed by a processor of the playback device, such as the processor 202 of the playback device 200, or a processor of the playback device 500. In another example, the method 800 may alternatively be performed in whole or in part by a computing device, such as a server in communication with the playback device.

Method 800 may include one or more operations, functions, or actions as illustrated by one or more of blocks 802-808. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

As shown in FIG. 8, the method 800 involves receiving from at least one orientation sensor, orientation data indicating an orientation of a playback device at block 802, receiving from an array of proximity sensors, data indicating a physical contact at a location on an external surface of the playback device at block 804, based on at least (i) the orientation of the playback device and (ii) the location on the external surface, identifying a playback device action from a plurality of playback device actions at block 806, and causing at least the playback device to perform the identified playback device action at block 808.

At block 802, the method 800 involves receiving from at least one orientation sensor, orientation data indicating an orientation of a playback device. As indicated previously, the playback device 500 of FIGS. 5A, 5B, 7A. 7B, and 7C may include at least one orientation sensor. In one example, the at least one orientation sensor may include one or more accelerometers, one or more gyroscopes, and/or one or more geo-magnetic sensors, among other possibilities. The orientation sensor may be configured to detect an orientation of the playback device 500 and output orientation data indicating the detected orientation of the playback device 500. Accordingly, the processor of the playback device 500 may receive from the at least one orientation sensor, data indicating a current orientation of the playback device 500.

At block 804, the method 800 involves receiving from the array of proximity sensors, location data indicating a physical contact at a location on an external surface of the playback device. In one example, block 804 may be substantially similar to block 602 discussed above in connection to the method 600 of FIG. 6. Accordingly, any discussions relating to block 602 may also be applicable to block 804.

At block 806, the method 800 involves based on at least (i) the orientation of the playback device and (ii) the location on the external surface, identifying a playback device action from a plurality of playback device actions. In one example, identifying the playback device action from the plurality of playback device actions based on the location on the external surface may be substantially similar to block 604 as shown in and discussed above in connection to the method 600 of FIG. 6. As such, any discussions relating to block 604 may also be applicable to block 806.

At block 806, however, the playback device action may be identified also based on the orientation of the playback device. In one example, the physical contact characteristic(s) and playback device state, and the corresponding playback device actions shown in Table 1 may be applicable when the playback device 500 is in the first orientation 700 shown in FIG. 7A. In one example, physical contacts at the fourth region 702 and the fifth region 704 may correspond to playback device actions not shown in Table 1. In another example, the subset of the array of proximity sensors underlying the fourth and fifth regions 702 and 704 may be deactivated when the playback device 500 is in the first orientation 700. In further example, data received from proximity sensors in the array of proximity sensors that underlie the fourth and fifth regions 702 and 704 may be ignored by the processor when the playback device 500 is in the first orientation 700. Other examples are also possible.

While the playback device 500 is in the second orientation 730, or while the playback device 500 is in the third orientation 760, different playback device actions may correspond to different physical contact characteristics and playback device states.

Provided in Table 2 below are illustrative examples of physical contact characteristics and respective playback device actions while the playback device 500 is in the second orientation 730.

TABLE 2

| Detected Physical Contact Characteristic(s) and Playback Device State | Playback Device Action |
| --- | --- |
| 1 Tap in fifth region 704; Playback paused | Begin playback |
| 2 Tap in fifth region 704; Playback ongoing | Pause playback |
| 3 Tap in first region 552 | Decrease playback volume by 1 |
| 4 Tap in third region 556 | Increase playback volume by 1 |
| 5 Touch and hold in first region 552 | Decrease playback volume by 2 every 160 milliseconds |
| 6 Touch and hold in third region 556 | Increase playback volume by 2 every 160 milliseconds |
| 7 Double tap in fifth region 704; Playback paused | Begin playback of next track in playback queue |

TABLE 2-continued

| Detected Physical Contact Characteristic(s) and Playback Device State | Playback Device Action |
| --- | --- |
| 8 Double tap in fifth region 704; Playback ongoing | Skip to next track in playback queue |
| 9 Swipe from left to right across fifth region 704 | Skip to next track in playback queue |
| 10 Swipe from right to left across fifth region 704 | Skip to previous track in playback queue |
| 11 Dual swipe from left to right across fifth region 704 | Fast forward track 15 seconds |
| 12 Dual swipe from right to left across fifth region 704 | Rewind track 15 seconds |
| 13 Pinch within the fifth region 704 | Separate playback device from zone group of playback devices. |
| 14 Stretch within the fifth region 704 | Group playback device with other playback devices |

As shown in Table 2, and in contrast to Table 1, physical contact characteristics corresponding to the second region 554 may now correspond to the fifth region 704, on top of the playback device 500 in the second orientation 730. For instance, if the playback device 500 is playing media content, a tap detected in the fifth region 704 (as opposed to the second region 554) may correspond to the playback device action of pausing playback by the playback device 500. As also shown in Table 2, a tap in the first region 552 may still correspond to a decrease in the playback volume by 1, and a tap in the third region 556 may still correspond to an increase in the playback volume by 1.

In one example, physical contacts at the second region 554 while the playback device 500 is in the second orientation 730 may correspond to other playback device actions not shown in Table 2. In another example, the subset of the array of proximity sensors underlying the second region 554 may be deactivated when the playback device 500 is in the second orientation 730. In further example, data received from proximity sensors in the array of proximity sensors that underlie the second region 554 may be ignored by the processor when the playback device 500 is in the second orientation 730.

While the playback device 500 is in the second orientation 730, the playback device 500 may be placed on top of the fourth region 702. As such, the subset of the array of proximity sensors underlying the fourth region 702 may be deactivated when the playback device 500 is in the second orientation 730. In further example, data received from proximity sensors in the array of proximity sensors that underlie the fourth region 702 may be ignored by the processor when the playback device 500 is in the second orientation 730. Other examples are also possible.

Provided in Table 3 below are illustrative examples of physical contact characteristics and respective playback device actions while the playback device 500 is in the third orientation 760.

TABLE 3

| Detected Physical Contact Characteristic(s) and Playback Device State | Playback Device Action |
| --- | --- |
| 1 Tap in fourth region 702; Playback paused | Begin playback |
| 2 Tap in fourth region 702; Playback ongoing | Pause playback |
| 3 Tap in third region | Decrease playback volume by 1 |

TABLE 3-continued

| Detected Physical Contact Characteristic(s) and Playback Device State | Playback Device Action |
|---|---|
| 4 Tap in 556first region 552 | Increase playback volume by 1 |
| 5 Touch and hold in third region 556 | Decrease playback volume by 2 every 160 milliseconds |
| 6 Touch and hold in first region 552 | Increase playback volume by 2 every 160 milliseconds |
| 7 Double tap in fourth region 702; Playback paused | Begin playback of next track in playback queue |
| 8 Double tap in fourth region 702; Playback ongoing | Skip to next track in playback queue |
| 9 Swipe from left to right across fourth region 702 | Skip to next track in playback queue |
| 10 Swipe from right to left across fourth region 702 | Skip to previous track in playback queue |
| 11 Dual swipe from left to right across fourth region 702 | Fast forward track 15 seconds |
| 12 Dual swipe from right to left across fourth region 702 | Rewind track 15 seconds |
| 13 Pinch within the fourth region 702 | Separate playback device from zone group of playback devices. |
| 14 Stretch within the fourth region 702 | Group playback device with other playback devices |

As shown in Table 3, and in contrast to Tables 1 and 2, physical contact characteristics corresponding to the second region 554 in Table 1, and the fifth region 704 in Table 2, may now correspond to the fourth region 702, on top of the playback device 500 in the third orientation 760. For instance, if the playback device 500 is playing media content, a tap detected in the fourth region 702 (as opposed to the second region 554 or the fifth region 704) may correspond to the playback device action of pausing playback by the playback device 500.

As also shown in Table 3, a tap in the first region 552 may now correspond to an increase in the playback volume by 1, rather than a decrease in the playback volume by 1 as shown in Tables 1 and 2. Analogously, a tap in the third region 556 may now correspond to a decrease in the playback volume by 1 rather than an increase in the playback volume by 1 as shown in Tables 1 and 2. In this case, because the first region 552 is physically above the third region 556 while the playback device 500 is in the third orientation 760, having a tap in the first region 552 correspond to an increase volume while having a tap in the third region 556 correspond to a decrease in volume may be more intuitive to a user of the playback device 500.

In one example, physical contacts at the second region 554 while the playback device 500 is in the third orientation 760 may correspond to other playback device actions not shown in Table 3. In another example, the subset of the array of proximity sensors underlying the second region 554 may be deactivated when the playback device 500 is in the third orientation 760. In further example, data received from proximity sensors in the array of proximity sensors that underlie the second region 554 may be ignored by the processor when the playback device 500 is in the third orientation 760.

While the playback device 500 is in the third orientation 760, the playback device 500 may be placed on top of the fifth region 704. As such, the subset of the array of proximity sensors underlying the fifth region 704 may be deactivated when the playback device 500 is in the third orientation 760. In further example, data received from proximity sensors in the array of proximity sensors that underlie the fifth region 704 may be ignored by the processor when the playback device 500 is in the third orientation 760. Other examples are also possible.

One having ordinary skill in the art will appreciate that Table 2 and Table 3 are provided for illustration purposes and that other examples are also possible.

At block 808, the method 800 involves causing at least the playback device to perform the identified playback device action. In one example, block 808 may be substantially similar to block 606 discussed above in connection to the method 600 of FIG. 6. Accordingly, any discussions relating to block 606 may also be applicable to block 808.

In one example, the at least one orientation sensor of the playback device 500 may also detect movement of the playback device 500. In some cases, the playback device 500 may be in motion when a user is moving the playback device 500. While moving the playback device 500, the user may make physical contact with regions of the external surface of the playback device 500 that have underlying proximity sensors. As such, physical contacts may be detected and playback device actions may be identified when the user is moving the playback device 500, and not intending to provide an input to cause the playback device 500 to perform any playback device actions.

As such, in one example, if the orientation data received by the processor of the playback device 500 at block 802 further indicates that the playback device 500 is in motion, the processor may determine that no playback device action from the plurality of playback device actions is to be identified based on any physical contacts on the external surface of the playback device 500. In one case, the array of proximity sensors underlying the external surface of the playback device 500 may be deactivated when the playback device 500 is in motion. In another case, data received from proximity sensors in the array of proximity sensors underlying the external surface of the playback device 500 may be ignored by the processor when the playback device 500 is in motion. Other examples are also possible.

As indicated above, the array of proximity sensors may further be configured to detect presence within a proximal distance of the first region 552, second region 554, and third region 556 on the first surface 502, the fourth region 702 on the third surface 506, or the fifth region 704 on the second surface 504. In some cases, the playback device 500 may be positioned such that one or more of the first surface 502, the second surface 504, and the third surface 506 are against a solid surface, such as a wall or a side of a shelf. In such cases, physical contacts to cause the playback device 500 to perform certain playback device actions may be less likely to be provided by a user via the one or more surfaces that are against the solid surface. In such a case, based on a consistent presence detected within a proximal distance of a particular region on the external surface of the playback device 500, a subset of the proximity sensors underlying the particular region may be deactivated to reduce energy consumption of the playback device 500. In one instance, the deactivated subset of the proximity sensors may be reactivated when an orientation of the playback device 500 has changed, or if the playback device 500 has been moved. Other examples are also possible.

While discussions herein generally refer to a physical interaction with the external surface of the playback device as a physical contact with the external surface of the playback device, one having ordinary skill in the art will appreciate that the physical interaction, as indicated previously, may additionally or alternatively be a physical presence within a predetermined proximal distance from the external surface of the playback device.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A playback device comprising:
    an enclosure comprising a first external surface comprising a speaker grille and a second external surface substantially orthogonal to the first external surface;
    an array of proximity sensors underlying the second external surface of the playback device;
    an orientation sensor;
    a processor; and
    memory having stored thereon instructions executable by the processor to cause the processor to perform functions comprising:
        entering a given playback state;
        while in the given playback state, receiving, via the array of proximity sensors, location data indicating a physical contact at a given location on the array of proximity sensors;
        in response to receiving the location data:
            if orientation data from the orientation sensor indicates that the enclosure is in a first orientation, causing the playback device to perform a first playback action that changes the given playback state of the playback device, the first playback action corresponding to (i) physical contact at the given location on the array of proximity sensors, (ii) the first orientation, and (iii) the given playback state; and
            if orientation data from the orientation sensor indicates that the enclosure is in a second orientation, causing the playback device to perform a second playback action that changes the given playback state of the playback device, the second playback action corresponding to (i) physical contact at the given location on the array of proximity sensors, (ii) the second orientation, and (iii) the given playback state, wherein the second playback action is different from the first playback action.

2. The playback device of claim 1, wherein the array of proximity sensors comprises a first volume control and a second volume control, wherein receiving location data indicating the physical contact at the given location on the array of proximity sensors comprises receiving data indicating a physical contact at the first volume control, wherein causing the playback device to perform the first playback action comprises causing the playback device to increase playback volume, and wherein causing the playback device to perform the second playback action comprises causing the playback device to decrease playback volume.

3. The playback device of claim 2, wherein the playback device is in a group of playback devices configured to playback media content in synchrony, wherein causing the playback device to perform the first playback action comprises causing the group of playback device to increase volume of synchronous playback, and wherein causing the playback device to perform the second playback action comprises causing the group of playback device to decrease volume of synchronous playback.

4. The playback device of claim 2, wherein the functions further comprise:
    while orientation data from the orientation sensor indicates that the enclosure is in the second orientation, receiving, via the array of proximity sensors, location data indicating a physical contact at the second volume control; and
    causing the playback device to perform the first playback action, the first playback action corresponding to (i) physical contact at the second volume control, (ii) the second orientation, and (iii) the given playback state.

5. The playback device of claim 1, wherein the array of proximity sensors comprises a first touch control and a second touch control in a linear arrangement, wherein receiving location data indicating the physical contact at the given location on the array of proximity sensors comprises receiving data indicating a swipe contact from the first touch control to the second touch control, wherein causing the playback device to perform the first playback action comprises causing the playback device to skip to a subsequent audio track, and wherein causing the playback device to perform the second playback action comprises causing the playback device to skip to a previous audio track.

6. The playback device of claim 5, wherein the playback device is in a group of playback devices configured to playback media content in synchrony, wherein causing the playback device to perform the first playback action comprises causing the group of playback device to skip to the subsequent audio track in synchrony, and wherein causing the playback device to perform the second playback action comprises causing the group of playback device to skip to the previous audio track in synchrony.

7. The playback device of claim 1, wherein the playback device further comprises a proximity sensor underlying a third external surface of the enclosure that is substantially orthogonal to the first external surface and the second external surface, and wherein the functions further comprise:
while orientation data from the orientation sensor indicates that the enclosure is in the second orientation in which the third external surface is oriented upwards, receiving, via the proximity sensor underlying the third external surface, location data indicating a physical contact to the proximity sensor underlying the third external surface; and
causing the playback device to perform a third playback action, the third playback action corresponding to (i) physical contact to the proximity sensor underlying the third external surface (ii) the second orientation in which the third external surface is oriented upwards, and (iii) the given playback state, wherein the third playback action is different from the first playback action and the second playback action.

8. The playback device of claim 7, wherein the playback device further comprises a proximity sensor underlying a fourth external surface opposite the third external surface and substantially orthogonal to the first external surface and the second external surface, and wherein the functions further comprise:
while orientation data from the orientation sensor indicates that the enclosure is in the second orientation in which the fourth external surface is oriented upwards, receiving, via the proximity sensor underlying the fourth external surface, location data indicating a physical contact to the proximity sensor underlying the third external surface; and
causing the playback device to perform the third playback action, the third playback action corresponding to (i) physical contact to the proximity sensor underlying the fourth external surface, (ii) the second orientation in which the fourth external surface is oriented upwards, and (iii) the given playback state.

9. The playback device of claim 8, wherein the functions further comprise disabling the proximity sensor underlying a third external surface of the enclosure that is substantially orthogonal to the first external surface and the second external surface while the orientation data from the orientation sensor indicates that the enclosure is in the second orientation in which the fourth external surface is oriented upwards.

10. A tangible non-transitory, computer-readable media having instructions encoded therein, wherein the instructions, when executed by one or more processors, cause a playback device to perform functions comprising:
entering a given playback state;
while in the given playback state, receiving, via an array of proximity sensors, location data indicating a physical contact at a given location on the array of proximity sensors;
in response to receiving the location data:
if orientation data from an orientation sensor of the playback device indicates that an enclosure of the playback device is in a first orientation,
causing the playback device to perform a first playback action that changes the given playback state of the playback device, the first playback action corresponding to (i) physical contact at the given location on the array of proximity sensors, (ii) the first orientation, and (iii) the given playback state; and
if orientation data from the orientation sensor indicates that the enclosure is in a second orientation,
causing the playback device to perform a second playback action that changes the given playback state of the playback device, the second playback action corresponding to (i) physical contact at the given location on the array of proximity sensors, (ii) the second orientation, and (iii) the given playback state, wherein the second playback action is different from the first playback action.

11. The tangible non-transitory, computer-readable media of claim 10, wherein the array of proximity sensors comprises a first volume control and a second volume control, wherein receiving location data indicating the physical contact at the given location on the array of proximity sensors comprises receiving data indicating a physical contact at the first volume control, wherein causing the playback device to perform the first playback action comprises causing the playback device to increase playback volume, and wherein causing the playback device to perform the second playback action comprises causing the playback device to decrease playback volume.

12. The tangible non-transitory, computer-readable media of claim 11, wherein the playback device is in a group of playback devices configured to playback media content in synchrony, wherein causing the playback device to perform the first playback action comprises causing the group of playback device to increase volume of synchronous playback, and wherein causing the playback device to perform the second playback action comprises causing the group of playback device to decrease volume of synchronous playback.

13. The tangible non-transitory, computer-readable media of claim 11, wherein the functions further comprise:
while orientation data from the orientation sensor indicates that the enclosure is in the second orientation, receiving, via the array of proximity sensors, location data indicating a physical contact at the second volume control; and
causing the playback device to perform the first playback action, the first playback action corresponding to (i) physical contact at the second volume control, (ii) the second orientation, and (iii) the given playback state.

14. The tangible non-transitory, computer-readable media of claim 10, wherein the array of proximity sensors comprises a first touch control and a second touch control in a linear arrangement, wherein receiving location data indicating the physical contact at the given location on the array of proximity sensors comprises receiving data indicating a swipe contact from the first touch control to the second touch control, wherein causing the playback device to perform the first playback action comprises causing the playback device to skip to a subsequent audio track, and wherein causing the playback device to perform the second playback action comprises causing the playback device to skip to a previous audio track.

15. The playback device of claim 1, wherein the functions further comprise:

while orientation data from the orientation sensor indicates that the enclosure is in motion, disabling the array of proximity sensors.

16. The tangible non-transitory, computer-readable media of claim 10, wherein the functions further comprise:
while orientation data from the orientation sensor indicates that the enclosure is in motion, disabling the array of proximity sensors.

17. A method executable by a playback device, wherein the playback device comprises: an enclosure comprising a first external surface comprising a speaker grille and a second external surface substantially orthogonal to the first external surface; an array of proximity sensors underlying the second external surface of the playback device, and an orientation sensor, the method comprising:
entering a given playback state;
while in the given playback state, receiving, via the array of proximity sensors, location data indicating a physical contact at a given location on the array of proximity sensors;
in response to receiving the location data:
if orientation data from the orientation sensor indicates that the enclosure is in a first orientation, causing the playback device to perform a first playback action that changes the given playback state of the playback device, the first playback action corresponding to (i) physical contact at the given location on the array of proximity sensors, (ii) the first orientation, and (iii) the given playback state; and
if orientation data from the orientation sensor indicates that the enclosure is in a second orientation, causing the playback device to perform a second playback action that changes the given playback state of the playback device, the second playback action corresponding to (i) physical contact at the given location on the array of proximity sensors, (ii) the second orientation, and (iii) the given playback state, wherein the second playback action is different from the first playback action.

18. The method of claim 17, wherein the array of proximity sensors comprises a first volume control and a second volume control, wherein receiving location data indicating the physical contact at the given location on the array of proximity sensors comprises receiving data indicating a physical contact at the first volume control, wherein causing the playback device to perform the first playback action comprises causing the playback device to increase playback volume, and wherein causing the playback device to perform the second playback action comprises causing the playback device to decrease playback volume.

19. The method of claim 17, wherein the array of proximity sensors comprises a first touch control and a second touch control in a linear arrangement, wherein receiving location data indicating the physical contact at the given location on the array of proximity sensors comprises receiving data indicating a swipe contact from the first touch control to the second touch control, wherein causing the playback device to perform the first playback action comprises causing the playback device to skip to a subsequent audio track, and wherein causing the playback device to perform the second playback action comprises causing the playback device to skip to a previous audio track.

20. The method of claim 17, wherein the playback device further comprises a proximity sensor underlying a third external surface of the enclosure that is substantially orthogonal to the first external surface and the second external surface, and wherein the method further comprises:
while orientation data from the orientation sensor indicates that the enclosure is in the second orientation in which the third external surface is oriented upwards, receiving, via the proximity sensor underlying the third external surface, location data indicating a physical contact to the proximity sensor underlying the third external surface; and
causing the playback device to perform a third playback action, the third playback action corresponding to (i) physical contact to the proximity sensor underlying the third external surface, (ii) the second orientation in which the third external surface is oriented upwards, and (iii) the given playback state, wherein the third playback action is different from the first playback action and the second playback action.

* * * * *